United States Patent [19]

Tomaszek

[11] Patent Number: 4,728,045
[45] Date of Patent: Mar. 1, 1988

[54] METHOD FOR RECLAIMING BONDED, TWO-RESIN ARTICLES

[75] Inventor: Thomas R. Tomaszek, Blackstone, Mass.

[73] Assignee: Nelmor Co., Inc., North Uxbridge, Mass.

[21] Appl. No.: 2,123

[22] Filed: Jan. 12, 1987

[51] Int. Cl.$^4$ ............................................. B02C 19/14
[52] U.S. Cl. ...................................... 241/19; 241/20; 241/24; 241/99
[58] Field of Search ............ 241/14, 24, 99, DIG. 38, 241/79.1, 19, 20; 521/46.5, 145; 264/37, DIG. 69

[56] References Cited

U.S. PATENT DOCUMENTS

| | | |
|---|---|---|
| 2,595,831 | 5/1952 | De Nie et al. |
| 2,879,005 | 3/1959 | Jarvis |
| 3,387,793 | 6/1968 | Burner |
| 3,650,396 | 3/1972 | Gillespie et al. |
| 3,738,483 | 6/1973 | MacKenzie |
| 3,790,091 | 2/1974 | Law et al. |
| 3,843,060 | 10/1974 | Colburn |
| 3,878,091 | 4/1975 | Hukki |
| 4,044,956 | 8/1977 | Benedetto et al. |
| 4,065,282 | 12/1977 | Morey |
| 4,067,826 | 1/1978 | Emery |
| 4,073,661 | 2/1978 | Buzga et al. |
| 4,079,837 | 3/1978 | Grube et al. |
| 4,098,464 | 7/1978 | Niedner et al. |
| 4,122,950 | 10/1978 | White et al. |
| 4,199,109 | 4/1980 | Watanabe |
| 4,200,486 | 4/1980 | Vagac et al. |
| 4,208,015 | 6/1980 | Fujita et al. |
| 4,242,197 | 12/1980 | Voelskow et al. |
| 4,245,999 | 1/1981 | Reiniger |
| 4,251,034 | 2/1981 | Corr et al. |
| 4,276,155 | 6/1981 | Roeschlaub et al. |
| 4,379,525 | 4/1983 | Nowicki et al. |
| 4,406,411 | 9/1983 | Gall et al. |
| 4,440,635 | 4/1984 | Reiniger |
| 4,483,488 | 11/1984 | Luff et al. |

OTHER PUBLICATIONS

Bold Series Central Station Granulators, Nelmor Company, Bulletin No. 3-105.2.
Nelmor/Weiss Densification Systems, Nelmor Company, Bulletin No. 11-105.1.
An Introduction to Electrostatic Separation, Bulletin 8570, Carpco Inc.
HTE Series Industrial Electrostatic Separators, Bulletin 8572, Capipco Inc.
Kice Multi-Aspirator.

Primary Examiner—Mark Rosenbaum
Attorney, Agent, or Firm—Kinzer, Plyer, Dorn, McEachran & Jambor

[57] ABSTRACT

A method and apparatus for reclaiming reusable resin materials from bottles and other scrap articles each comprising a first low density resin component (e.g., polyethylene) bonded to a second high density resin component (e.g., polyethylene terephthalate); the scrap articles are granulated to form a primary particulate scrap that is air classified to remove paper and film from labels, then flotation separated into a lightweight first resin (PE) material that is dried and air classified for re-use, and a secondary particulate scrap. The secondary scrap is vigorously washed in a hot aqueous medium to disrupt bonds in chips containing both resins, then thoroughly rinsed and again flotation separated into a heavy second resin material that is dried and air cleaned for re-use; there is also a residual low density scrap from the second flotation stage that is returned to the first flotation stage. The flotation separation stages each include a first auger in an apertured-bottom trough positioned near the top of a flotation tank with inlet means depositing particulate scrap and flotation liquid scrap in one end of the trough; the heavy material output is afforded by a second auger in the bottom of the tank, whereas the lightweight material outlet is an overflow weir at one side of the tank.

26 Claims, 4 Drawing Figures

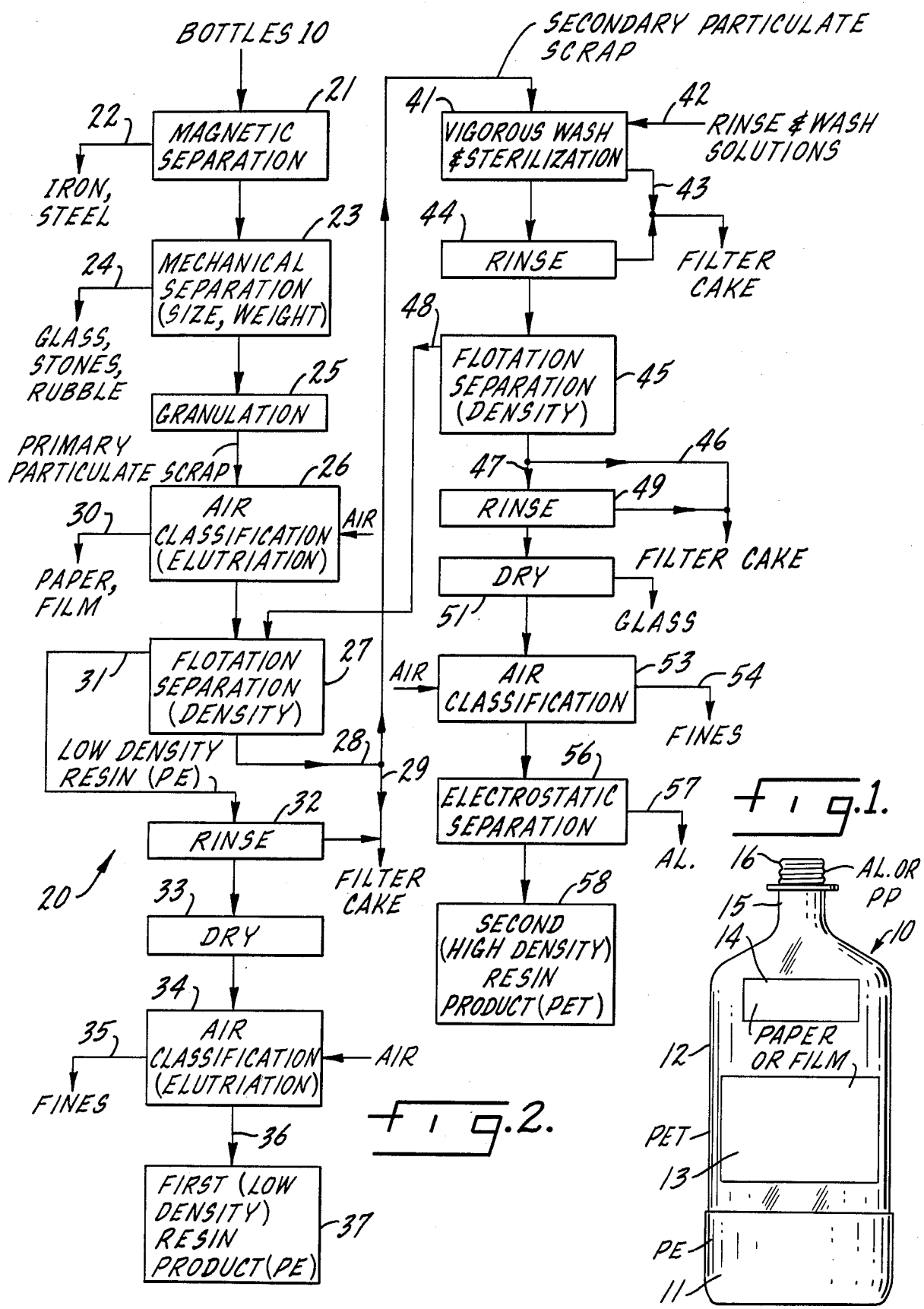

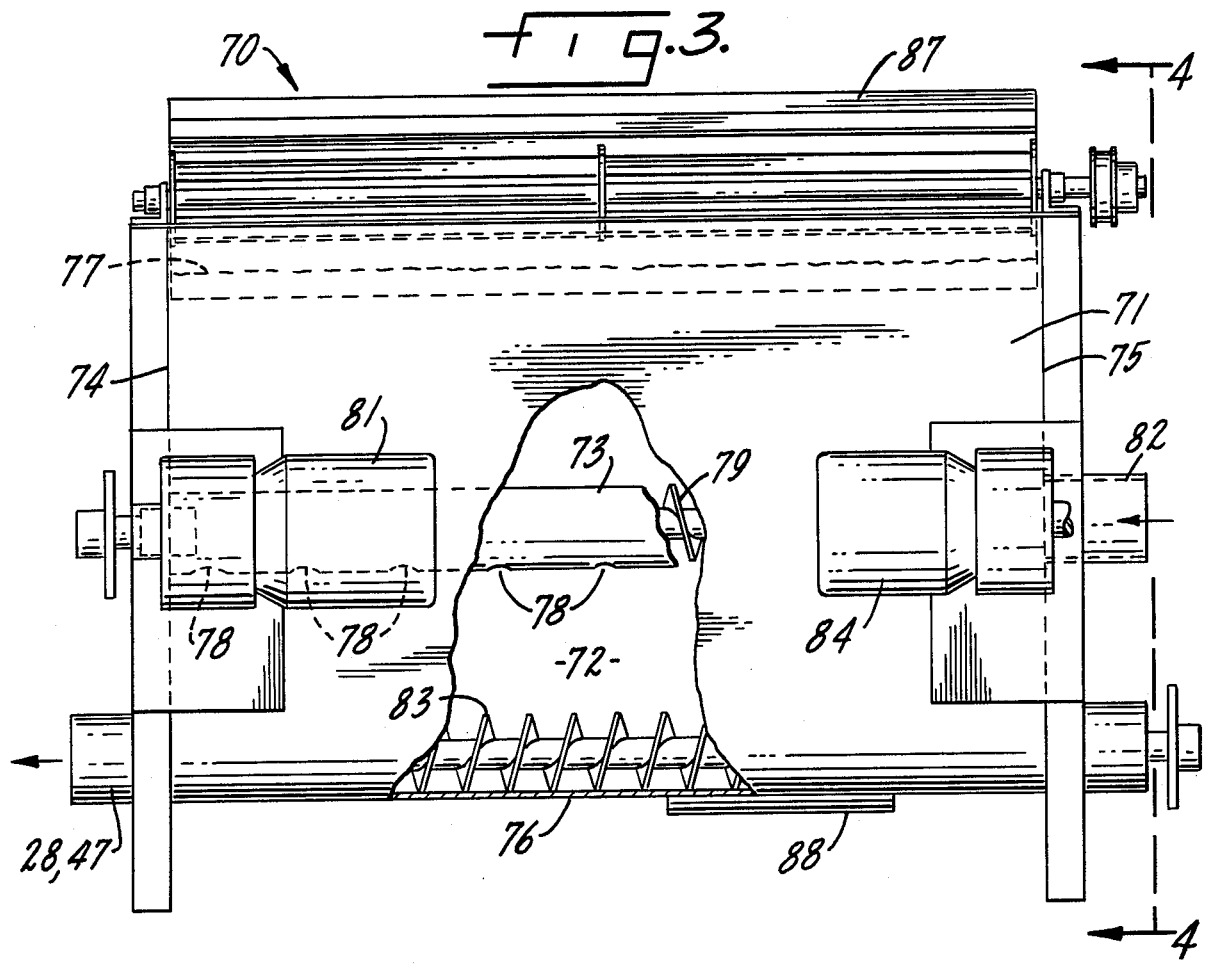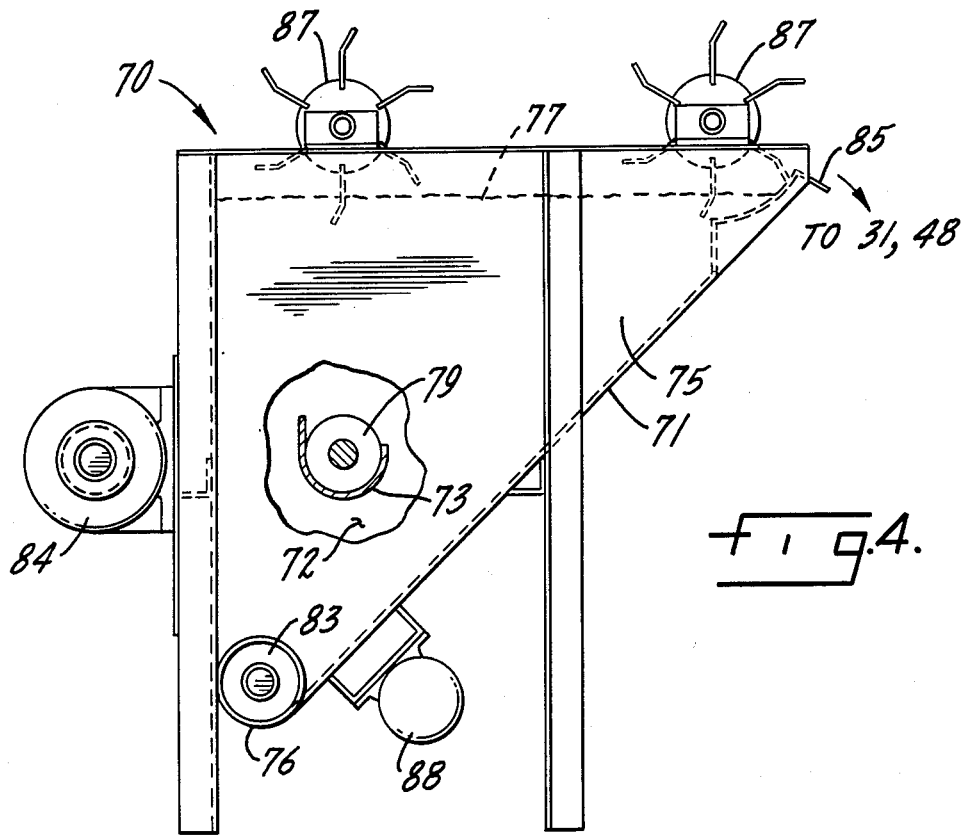

METHOD FOR RECLAIMING BONDED, TWO-RESIN ARTICLES

BACKGROUND OF THE INVENTION

Molded plastic bottles and like containers are in widespread and continually expanding use for a wide variety of liquids, powders, granulates, and other diverse products. The resins used in these bottles and containers include high-density polyethylene, polypropylene, polyethylene terephthlate, and others. As in any other manufacturing process, there is likely to be considerable scrap created due to flaws in the bottles or other containers created during molding operations. Other containers must be scrapped when identifying labels, usually paper but frequently and increasingly plastic film, are misapplied. These problems are particularly apparent when in-mold labelling and decoration are utilized; it has been estimated that 3% to 5% of plastic bottles, as manufactured, are rejected. Furthermore, plastic bottles and like containers are seldom acceptable for reuse as is; virtually every sound plastic bottle becomes a scrap bottle when emptied of its contents.

Effective and economical reclamation of scrap plastic bottles has been achieved in some instances, even when label materials must be removed during reclaiming operations. Thus, effective reclamation of reject blow-molded polyethylene containers for laundry-household liquids with paper labels secured to the containers by a heat-sealed gel lacquer has been successfully accomplished, using dry mechanical impact procedures. Other reclamation processes have also been used.

The problems of reclamation of plastic bottles and like scrap articles, however, are materially exacerbated when each bottle is formed of two or more components, bonded to each other, the components being molded of different resins. This situation is perhaps best exemplified by beverage bottles now in common use, formed of molded polyethylene terephthlate bodies bonded to high density polyethylene bases. These beverage bottles usually have aluminum or polypropylene caps; their labels may comprise paper or plastic film, usually polypropylene. The conventional techniques used for plastic container reclamation, wet or dry, are not really efficient as applied to these bottles; in particular, they are not as effective as desirable in breaking down the bond between the components of the two different resins so that those resins can be separated for subsequent use. Other problems occur in connection with elimination or other acommodation of label and cap materials in the reclamation process.

Summary of the Invention

It is a primary object of the invention, therefore, to provide a new and improved process for reclaiming two separately reusable resin materials from scrap bottles and other articles each comprising at least one component of a low density resin bonded to at least one component of a high density resin, with improved segregation of the two resins in the two reusable materials.

Another object of the invention is to provide a new and improved process for reclaiming two-resin bottles and like articles that effectively combines two flotation stages with a preferred washing and sterilization procedure to assure thorough separation of the reclaimed resins in two separate reusable materials.

Accordingly, the invention relates to a process for reclaiming reusable resin materials from scrap articles each comprising at least one component formed of a first resin having a first, low density, bonded to at least one component formed of a second resin having a second, higher density. The process may include the following steps:

A. comminuting the scrap articles to form a primary particulate scrap;

A1. air classifying the primary particulate scrap after comminution to remove paper, film and fines therefrom;

B. separating particles of the two resins by flotation of the primary particulate scrap in a liquid having a density intermediate the first and second resin densities, producing a reusable first resin material and a secondary particulate scrap;

B1. rinsing and drying the reusable first resin material after separation in step B;

B2. air classifying the rinsed and dried reusable first resin material from step B1 to remove fines;

C. vigorously washing the secondary particulate scrap from step B to break down the bonds in particles containing both of the first and second resins;

D. gain separating particles of the two resins, by flotation of the washed secondary particulate scrap from step C in the same manner as in Step B, producing a reusable second resin material and a residual low density scrap;

D1. rinsing and drying the reusable second resin material after separation in step D;

D2. air classifying the rinsed and dried reusable second resin material from step D1 to remove fines;

D3. electrostatically separating conductive metal particles from the reusable second resin material subsequent to one of steps D1 and D2; and E. returning the residual low density scrap from step D to step B.

The more critical steps are those without numerals.

BRIEF DESCRIPTION OF THE DRAWINGS

FIG. 1 is an elevation view of a bottle representative of the scrap articles to which the method of the present invention is applicable;

FIG. 2 is a system diagram and flow chart illustrating the steps of the method of the invention;

FIG. 3 is a partially sectional side elevation view of a flotation separation apparatus used in two stages of the reclamation system of FIG. 2; and FIG. 4 is a partly sectional elevation view taken approximately along line 4—4 in FIG. 3.

DESCRIPTION OF THE PREFERRED EMBODIMENTS

The beverage bottle 10 shown in FIG. 1 is typical of many plastic containers which, when improperly formed or when emptied, comprise scrap articles appropriate for reclamation by the method and system of the present invention. Bottle 10, for example, is commonly used for both carbonated and non-carbonated beverages, usually in one-half, one and two liter sizes. The base 11 of bottle 10, which is frequently black in color, is usually molded of a light weight resin. The most frequently used resin for base 11 is high density polyethylene, referred to herein as "PE". Base 11 is bonded to a main body 12 molded from a second resin of greater density, most frequently polyethylene terephthalate, referred to herein as "PET". The adhesive bond between base 11 and container body 12 is quite strong;

separation of base 11 from the main body 12 of the bottle, in use, is not permissible.

Bottle 10 usually carries one or more labels, such as labels 13 and 14, that are adhesively affixed to the main body 12 of the bottle. Labels 13 and 14 are often formed of paper. On the other hand, a lightweight plastic film such as a film of polypropylene ("PP") may be employed for the labels. At its top, bottle 10 has a neck 15 closed by a conventional cap 16. Cap 16 may be of molded plastic, usually polypropylene; more frequently the cap is is formed of aluminum.

The basic method and system 20 of the present invention are best illustrated in the block diagram/flow chart, FIG. 2. System 20 starts with a magnetic separation input stage 21. Stage 21 may comprise an infeed conveyor having a magnetic head end pulley with a crosshead magnetic conveyor, an arrangement that will eliminate any ferrous metal scrap (iron or steel) that may be fed into system 20 inadvertently, along with bottles 10. Other types of magnetic separator may be used in stage 21 if preferred. The ferrous metal scrap is discharged from stage 21 at a waste outlet 22.

The next stage 23 is preferably a set of conveyors arranged for mechanical separation by size and weight. Thus, stage 23 may include two or more inclined conveyors up which the light-weight empty bottles 10 can travel but which will not transport stones, glass, and other small or heavy rubble items. This rubble is discharged from stage 23, through a space between the conveyors, to another waste outlet 24. The essentially unusable scrap discharged through the waste outlets 22 and 24 is discarded. The relative positions of stages 21 and 23 in system 20 may be reversed if desired.

The next subsequent stage 25 comprises a granulator for comminuting scrap articles (the bottles 10) to form a primary particulate scrap. In a typical installation, the grinder or granulator used in stage 25 may be a Nelmor Co. Inc. Model G1830M granulator having a three-blade open rotor with an involute, tangential feed entry. The granulator chops the bottles 10 into chips or flakes, preferably of approximately three-quarter inch maximum dimension. The chip size can be varied to some extent, but this size is most manageable in the overall process of system 20. This primary particulate scrap is discharged from stage 25 to an air classification or elutriation stage 26.

The air classification or elutriation apparatus in stage 26 may comprise two cyclone separators connected in sequence. Stage 26 is utilized to separate paper and other film materials, usually labels, from the primary particulate scrap that constitutes the input to stage 26. The paper and other film materials are discharged from stage 25 through an outlet 30 and are discarded. The remaining primary particulate scrap is discharged from air classification stage 26 to a first flotation stage 27.

The primary particulate scrap supplied to flotation stage 27 from elutriation stage 26 includes chips or particles formed of a first light weight resin, in this instance the PE resin from base 11 of bottle 10 (FIG. 1). This same primary particulate scrap also includes a substantial quantity of chips of the heavier, denser PET resin which forms bottle body 12. The primary particulate scrap input to stage 27 further includes chips composed of particles of both of the PE and PET resins, bonded to each other. There are also particles of aluminum (from bottle caps 16) and some remaining traces of paper or resin film from labels 13 and 14.

Flotation stage 27 comprises a flotation tank filled with a liquid that has a density intermediate the density of the first resin, such as the PE from base 11, and the density of the heavier second resin, in this instance the PET from bottle body 12. Because water has a density intermediate that of PE and PET it may be used as the flotation medium in flotation step 27. Usually, the flotation medium is an aqueous solution, as discussed hereinafter in connection with FIGS. 3 and 4. The heavier, denser resin (PET) settles to the bottom of the tank and is drawn off through a first main outlet 28. Fine particles are removed, as filter cake, through a conduit 29 that may be part of a fluid recirculation arrangement (not shown) for the flotation tank. The lightweight resin (PE), however, floats on the liquid in stage 27 and hence can be drawn off through a second main outlet 31 leading to a rinse stage 32. If caps 16 or other components from which the scrap is made are formed of polypropylene, the resulting PP chips also float off and are discharged with the PE chips through outlet 31.

Rinse stage 32 for the low density resin (PE) may comprise a rinsing flume to remove liquid contaminants, and is followed by a centrifugal dryer 33. The dry first resin (PE) from the outlet of stage 33 is supplied to an air classification or elutriation stage 34. Stage 34 may be preferably essentially a duplicate of stage 26, or it may comprise a cascade labyrinth type of air classifier. Fine particles and any remaining paper or film are discharged from stage 34 through a waste outlet 35. The main outlet 36 from stage 34 discharges a reusable low density first resin material consisting essentially of clean, dry polyethylene chips; see stage 37. A further size reduction for the PE chip output from outlet 36 may be carried out if desired.

Referring back to the first flotation stage 27 of system 20, FIG. 2, it may be seen that its first main outlet 28, for high density material, discharges a secondary particulate scrap into a wash and sterilization stage 41. In stage 41, the chips of PET and PE/PET and the traces of aluminum, PE and paper or PP that constitute this secondary particulate scrap are first rinsed in hot water, then vigorously and violently washed in a washing and sterilizing solution introduced through an inlet 42, followed by a further hot water rinse. The washing and sterilizing solution is preferably hot water plus an alkaline base detergent (e.g., OAKITE No. 161 or TURBOLENE) with potassium hydroxide or sodium hydroxide. That kind of solution precludes build-up of microorganisms and assists in separating PE and other particles from the PET chips in the secondary particulate scrap. A number of different forms of washing and sterilizing equipment could be used in stage 41. One efficient washing and sterilizing apparatus effectively usable in stage 41 is a high speed agitating washer incorporating two rotating agitators having operating speeds of 1750 rpm, with a washing sequence control and drain ports, sold by Nelmor Co., Inc. under the trade designation WASHLUX. It should be noted that in stage 41 all rinse and wash liquids are introduced into the top of the washing equipment and drained from the bottom, a procedure of some importance particularly as regards the effectiveness of the final rinse. There is a filter output 43 from stage 41, a part of a rechargeable countercurrent filtration system used to remove waste by-products in the form of filter cake. The washing and sterilizing solution may be fully or partially recirculated back to stage 41 through input 42.

The secondary particulate scrap from stage 41 is fed to the next stage 44 of system 20 where it may be subjected to a further cleaning rinse to remove any remaining traces of the detergents and other chemicals used in the sterilization and washing apparatus of stage 41. In this secondary particulate scrap, the bonds in any chips or particles containing both of the first and second resins have been broken down, disrupted by the washing/sterilizing action of stage 41. Thus, in the output from stage 41 to stage 44 there are virtually no more chips or flakes containing both the first and second resins (PE and PET); essentially all of the particles are one resin or the other but not both. This is also true of any label particles that may have remained bonded to either PET or PE chips or flakes through stage 27.

The next stage 45 in system 20 is a flotation stage that is essentially a duplicate of stage 27. As before, there is a filtered output 46, which may be a part of a flotation fluid recirculation arrangement, from which the filter cake is discarded. There is a first main output 47 that passes the heavier particles from stage 45 on to the next stage 49. The second, flotation output 48 from stage 45, consisting primarily of particles of polyethylene, is returned to the input of the first flotation stage 27. The material from output 48 may also include traces of PET particles and other trace materials (aluminum, PP, etc.)

Stage 49 is a rinse flume and is followed by a dryer 51 for the dense particulate PET material received from the main output 47 from the bottom of flotation stage 45. A centrifugal dryer is suitable. Any heavy scrap, such as glass, that still accompanies the PET chips may be discharged from dryer stage 51 through an waste outlet 52. The main output from dryer 51 is connected to an air classification stage 53. The apparatus in stage 53 could include equipment essentially similar to that employed in the prior air classification stages 26 and 34. Preferably, however, stage 53 is a cascade type air classifier.

Dust and other fines from air classifier 53 are removed through a waste outlet 54. The main output from stage 53, consisting primarily of particles of the heavier PET resin plus some aluminum particles, is fed into a conventional electrostatic metal separator stage 56, which utilizes a high intensity, high gradient electrostatic charge applied to the particulate material. The conductivity of the aluminum (and any other metal) particles causes rapid dissipation of that charge, whereas the PET chips hold the charge. This allows effective separation of the aluminum particles from the resin chips. Aluminum particles are discharged to an outlet 57. The aluminum from outlet 57 may be marketable if adequate control is exercised over the input to system 20 so that undue contamination with other metals is avoided.

The principal output from separator 46 is a reusable second resin material, relatively pure PET, in clean, dry chip form; see stage 58. An additional grinder or granulator stage may be provided for further size reduction of the PET material 58, just as in the case of the PE material 27. However, this additional grinder is not essential to the basic process.

Additional processing may be applied to the PET chips from stage 58 in system 20 (FIG. 2). Thus, the PET particles may be hydroscopically dried to remove internal moisture, facilitating subsequent re-extrusion to form an end product of increased value. An instantaneous melting rotary extruder may be utilized for direct processing of this heavy resin product. In an arrangement of this kind, the resin particles are pre-heated by infra-red ceramic heaters and then metered into the throat of the extrusion equipment; they fall onto a hot spinning rotor, producing a thin molten plastic film on the rotor. Air, moisture, and volatile gases are continuously vented during this procedure. The PET material progresses from a feed zone through a transition zone and into an compression zone. These three distinct zones, each characterized by an appreciable reduction in cross-sectional area, create the interparticular friction necessary to achieve a working melt. The molten PET mass is then pumped through a series of orifices into a manifold for extrusion into sheet form, which may be shaped into end products. Alternatively, the flake or chip PET material can be re-pelletized and compounded into a readily marketable high bulk density pellet product for further reprocessing or resale; a conventional resin reclamation extrusion operation is also usable.

FIGS. 3 and 4 illustrate a flotation apparatus 70 that is usable for stage 27 and also for stage 48 in the overall resin reclamation system 20 of FIG. 2. Flotation apparatus 70 comprises a tank 71 filled with a liquid flotation medium 72. The flotation medium 72 should have a density intermediate the densities of the first and second resins, in this instance polyethylene and polyethylene terephthlate. For bottles 10, in which the major components are PE and PET, water affords a usable flotation medium because it has a density intermediate the two resins. In most instances, however, it is necessary or desirable to recirculate or reuse the flotation liquid, so that water alone is not particularly desirable. Thus, aqueous solutions that include detergents, fungicides, bactericides, wetting agents, water softeners and other like additives are preferable.

A trough 73 is mounted in tank 71, extending from one tank end wall 74 to the other end wall 75. Trough 73 is located well above the tank bottom 76; however, the top of the trough should be below the upper level 77 of the flotation medium 72. There are a series of openings 78 in the bottom of trough 73. A first or input auger 79 extends longitudinally of the trough. Input auger 79 is driven by appropriate means such as a motor 81.

Flotation apparatus 70 includes inlet means 82 for introducing a flow of particulate scrap material and the flotation liquid into one end of trough 73. In this instance, inlet conduit 82 is located at the right-hand end of trough 73 as seen in FIG. 3. The particulate material supplied to apparatus 70 through inlet 82 is derived from the outlet of either stage 26 or stage 44 in system 20; see FIG. 2. Auger 79 impels the contents of trough 73 from inlet 82 toward the trough openings 78.

Flotation apparatus 70 has a first main outlet, located at one end of the bottom 76 of tank 71, for discharging particles of the second, heavier resin (PET) from the tank. In FIG. 3 the first main outlet is identified by reference numerals 28 and 47, in conformity with the use of those numerals in FIG. 2. This first main outlet 28,47 is aligned with a relatively large auger 83 that extends along the bottom of tank 71 and is driven by appropriate means such as a motor 84. Apparatus 70 also has a discharge weir 85 at one side of tank 71; weir 85 is connected to a second main outlet identified by reference numerals 31 and 48 from FIG. 2. A pair of paddle wheels 87, which may be driven from motor 81, maintain a steady movement of the surface portion of liquid 72 toward weir 85. A vibrator 88 may be mounted on tank 71; the vibrator is unnecessary in some instances but may be required in others.

In operation, assuming that apparatus 70 is utilized as the flotation separation stage 27 in system 20, the primary particulate scrap is introduced into trough 73 through inlet 82 in conjunction with a flow of the aqueous solution that constitutes flotation medium 72. The light weight chips of polyethylene, with perhaps some of polypropylene, float to the surface 77 of medium 72. Those lightweight resin particles, aided by paddle wheels 87, flow over weir 85 and are discharged through outlet 31. The heavier PET chips and flakes are propelled along trough 73 by auger 79 and pass through the bottom openings 78 into the lower part of tank 71. The heavier PET articles accumulate along the bottom 76 of tank 71 and are propelled out through the first main outlet 28 by auger 83.

The operation is the same for the second flotation separation stage 45 of system 20. Only a very minor portion of the original light weight (polyethylene) particles reach stage 45 and most of this lightweight resin content in the secondary particulate scrap supplied to stage 45 comes from the separation of bonded dual-resin particles in the wash stage 41. In any event, the major difference is that the light weight resin particles discharged through outlet 48 of apparatus 70, as used for stage 45, are returned to stage 27 so that the polyethylene can be salvaged, as previously described.

In flotation apparatus 70, as used for either stage 27 or stage 45 in system 20 (FIG. 2), the heavy resin chips may tend to accumulate tiny air bubbles on their surfaces, depending to some extent on the flotation medium 72, the specific heavy resin involved, and other factors. If the specific gravity (density) of the heavy resin is only slightly greater than that of the flotation medium, the resin particles may not settle out in the manner necessary to effective operation of flotation apparatus. In these circumstances vibrator 88 may be employed to dislodge the air from the resin chip surfaces. Vibration at various frequencies may be utilized; ultrasonic vibration is usually most effective.

System 20 can be used in a bottle manufacturing plant; it is quite efficient as applied to reclamation of scrap dual-resin articles generated in such a plant. In a manufacturing plant environment there is no more than a limited likelihood of a non-uniform input to the system, so that control of the quality of the two reusable resin material outputs is relatively easy.

System 20, however, is also intended for reclamation of articles that are deemed scrap only because they have been used once, typically containers such as bottles 10 that have been drained of their contents. In this application, there is a much greater possibility that some of the input to the system will be scrap articles that are different from those for which the system is designed.

Assuming that PET/PE bottles 10 are the intended input to system 20, there is a substantial possibility and even a probability that some of the commonly employed containers molded entirely of high density polyethylene will be fed into the system. This presents no problem. System 20 accomodates (removes) the labels, whether paper or resin film, and the PE container bodies merely contribute to a greater output from stage 37. Similarly, if all-PET containers are supplied to system 20, the net result is merely an increased output at stage 58, with no substantial problems.

If scrap articles formed wholly or in substantial part from polypropylene are introduced into system 20, the PP ends up in particulate form in the PE output of stage 37. This is not a substantial problem as long as the quantity of PP is quite small relative to the PE because the two resins are generally compatible. Moreover, scrap articles formed of a heavy resin other than PET will lead to the presence of some of that resin in the high density output from stage 58. If the heavy resin is not incompatible with PET and is present only in quite limited quantities, its presence may not devalue the stage 58 output.

System 20 can be applied to reclamation of virtually any two-resin articles, in which the resins are in separate components bonded to each other, so long as there is an appreciable difference in density between the resins and a suitable flotation medium is available. The same system can be extended to three-resin articles, provided there is an effective basis for further separation of one of the light or heavy resin outputs to segregate the third resin. System 20 is quite energy-efficient, as well as highly effective in separating the different resins, due at least in part to its sequence of initial flotation separation in stage 27, vigorous washing to break up two-resin chips in stage 41, and further flotation separation in stage 45 with a light weight feedback to stage 27.

I claim:

1. A process for reclaiming reusable resin materials from scrap articles each comprising at least one component formed of a first resin having a first, low density, bonded to at least one component formed of a second resin having a second, higher density, comprising the following steps:
    A. comminuting the scrap articles to form a primary particulate scrap;
    B. separating particles of the two resins by flotation of the primary particulate scrap in a liquid having a density intermediate the first and second resin densities, producing a reusable first resin material and a secondary particulate scrap;
    C. vigorously washing the secondary particulate scrap to break down the bonds in particles containing both of the first and second resins;
    D. and again separating particles of the two resins, by flotation of the washed secondary particulate scrap from step C in the same manner as in Step B, producing a reusable second resin material and a residual low density scrap.

2. A process for reclaiming reusable resin materials from dual resin scrap articles, according to claim 1, and further comprising:
    E. returning the residual low density scrap from step D to step B.

3. A process for reclaiming reusable resin materials from dual resin scrap articles, according to claim 2, in which the scrap articles are bottles, and the second resin is polyethylene terephthlate.

4. A process for reclaiming reusable resin materials from dual resin scrap articles, according to claim 1, and further comprising:
    A1. air classifying the primary particulate scrap after comminution in step A to remove paper, film, and fines from the primary particulate scrap prior to flotation separation in step B.

5. A process for reclaiming reusable resin materials from dual resin scrap articles, according to claim 4, and further comprising:
    E. returning the residual low density scrap from step D to step B.

6. A process for reclaiming reusable resin materials from dual resin scrap articles, according to claim 1, and further comprising:
   B1. rinsing and drying the reusable first resin material after separation in step B; and
   B2. air classifying the rinsed and dried reusable first resin material from step B1 to remove fines.

7. A process for reclaiming reusable resin materials from dual resin scrap articles, according to claim 6, and further comprising:
   E. returning the residual low density scrap from step D to step B.

8. A process for reclaiming reusable resin materials from dual resin scrap articles, according to claim 7, and further comprising:
   A1. air classifying the primary particulate scrap after comminution in step A to remove paper, film, and fines from the primary particulate scrap prior to flotation separation in step B.

9. A process for reclaiming reusable resin materials from dual resin scrap articles, according to claim 8, in which the scrap articles are bottles, and the second resin is polyethylene terephthlate.

10. A process for reclaiming reusable resin materials from dual resin scrap articles, according to claim 1, and further comprising:
    D1. rinsing and drying the reusable second resin material after separation in step D; and
    D2. air classifying the rinsed and dried reusable second resin material from step D1 to remove fines.

11. A process for reclaiming reusable resin materials from dual resin scrap articles, according to claim 10, and further comprising:
    E. returning the residual low density scrap from step D to step B.

12. A process for reclaiming reusable resin materials from dual resin scrap articles, according to claim 11, and further comprising:
    A1. air classifying the primary particulate scrap after comminution in step A to remove paper, film, and fines from the primary particulate scrap prior to flotation separation in step B.

13. A process for reclaiming reusable resin materials from dual resin scrap articles, according to claim 12, in which the scrap articles are bottles, and the second resin is polyethylene terephthlate.

14. A process for reclaiming reusable resin materials from dual resin scrap articles, according to claim 10, and further comprising:
    D3. electrostatically separating conductive metal particles from the reusable second resin material subsequent to one of steps D1 and D2.

15. A process for reclaiming reusable resin materials from dual resin scrap articles, according to claim 1, in which step C is carried out with a hot aqueous detergent solution.

16. A process for reclaiming reusable resin materials from dual resin scrap articles, according to claim 15, in which in step C all rinse and wash liquids are introduced into the top of the washing equipment and drained from the bottom thereof.

17. A process for reclaiming reusable resin materials from dual resin scrap articles, according to claim 16, in which the hot aqueous detergent solution is a water solution of an alkaline base detergent with potassium hydroxide or sodium hydroxide.

18. A process for reclaiming reusable resin materials from dual resin scrap articles, according to claim 1, in which at least one of the steps B and D includes vibration, during flotation, to release air bubbles adhering to the scrap particles.

19. A process for reclaiming reusable resin materials from dual resin scrap articles, according to claim 18, and further comprising:
    E. returning the residual low density scrap from step D to step B.

20. A process for reclaiming reusable resin materials from scrap articles each comprising at least one component formed of a first resin having a first, low density, bonded to at least one component formed of a second resin having a second, higher density, comprising the following steps:
    A. comminuting the scrap articles to form a primary particulate scrap;
    A1. air classifying the primary particulate scrap after comminution to remove paper, film and fines therefrom;
    B. separating particles of the two resins by flotation of the primary particulate scrap in a liquid having a density intermediate the first and second resin densities, producing a reusable first resin material and a secondary particulate scrap;
    B1. rinsing and drying the reusable first resin material after separation in step B;
    B2. air classifying the rinsed and dried reusable first resin material from step B1 to remove fines;
    C. vigorously washing the secondary particulate scrap from step B to break down the bonds in particles containing both of the first and second resins;
    D. again separating particles of the two resins, by flotation of the washed secondary particulate scrap from step C in the same manner as in step B, producing a reusable second resin material and a residual low density scrap;
    D1. rinsing and drying the reusable second resin material after separation in step D;
    D2. air classifying the rinsed and dried reusable second resin material from step D1 to remove fines; and
    D3. electrostatically separating conductive metal particles from the reusable second resin material subsequent to one of steps D1 and D2.

21. A process for reclaiming reusable resin materials from dual resin scrap articles, according to claim 20, and further comprising:
    E. returning the residual low density scrap from step D to step B.

22. A process for reclaiming reusable resin materials from dual resin scrap articles, according to claim 21, in which step C is carried out with a hot aqueous detergent solution.

23. A process for reclaiming reusable resin materials from dual resin scrap articles, according to claim 22, in which in step C all rinse and wash liquids are introduced into the top of the washing equipment and drained from the bottom thereof.

24. A process for reclaiming reusable resin materials from dual resin scrap articles, according to claim 23, in which the hot aqueous detergent solution is a water solution of an alkaline base detergent with potassium hydroxide or sodium hydroxide.

25. A process for reclaiming reusable resin material from dual resin scrap articles, according to claim 20, in which the scrap articles are bottles, the first resin is polyethylene, and the second resin is polyethylene terephthlate.

26. A process for reclaiming reusable resin materials form dual resin scrap articles, according to claim 20, in which at least one of the steps B and D includes vibration, during flotation, to release air bubbles adhering to the scrap particles.

* * * * *